United States Patent [19]

Goel et al.

[11] 4,134,317
[45] Jan. 16, 1979

[54] METHOD AND APPARATUS FOR FABRICATING VENT PLATE HAVING BOW-TIE SLOT ARRANGEMENT

[75] Inventors: Rajeshwar P. Goel, Monroeville; Terry L. Vota, Elizabeth; Thomas J. Lynch, Pittsburgh, all of Pa.

[73] Assignee: Westinghouse Electric Corp., Pittsburgh, Pa.

[21] Appl. No.: 827,766

[22] Filed: Aug. 25, 1977

Related U.S. Application Data

[62] Division of Ser. No. 661,076, Feb. 25, 1976, Pat. No. 4,061,937.

[51] Int. Cl.$^2$ .......................... B26F 1/04; B26D 5/30
[52] U.S. Cl. ........................................... 83/35; 83/71; 83/552; 83/925 R
[58] Field of Search ................... 83/71, 552, 550, 618, 83/34, 35, 39, 640, 549, 925 R, 277; 29/596

[56] References Cited

U.S. PATENT DOCUMENTS

| | | | |
|---|---|---|---|
| 3,449,991 | 6/1969 | Daniels | 83/71 |
| 3,481,033 | 12/1969 | Weiss et al. | 83/35 |
| 3,853,029 | 12/1974 | Todd | 83/552 |
| 3,902,389 | 9/1975 | Brown | 83/71 |
| 3,938,416 | 2/1976 | Beauplat | 83/552 |

*Primary Examiner*—Donald R. Schran
*Attorney, Agent, or Firm*—G. H. Telfer

[57] ABSTRACT

A vent plate for supporting a finger having a rivet portion is disposed intermediate adjacent core laminations in a dynamoelectric machine. A plurality of finger members secured to the vent plate cooperate with the core laminations to define a ventilation duct for circulation of a cooling gas through the core. The vent plate has a plurality of slot openings arranged to receive the rivet portions of each finger. The vent plate slots are characterized by a bow-tie outline defined by intersecting planar and curved side surfaces which permits variable orientation of rivet portions through a predetermined angular range.

6 Claims, 12 Drawing Figures

METHOD AND APPARATUS FOR FABRICATING VENT PLATE HAVING BOW-TIE SLOT ARRANGEMENT

This is a division of application Ser. No. 661,076 filed Feb. 25, 1976, now U.S. Pat. No. 4,061,937.

BACKGROUND OF THE INVENTION

The present invention relates to dynamoelectric machines, and more particularly to the structure and method of fabrication of a vent plate for use in ventilating the core of a dynamoelectric machine.

Description of the Prior Art

The operating efficiency of a dynamoelectric machine is adversely affected by a number of energy loss factors, such as hysteresis losses, eddy current losses, friction losses, and windage losses. Windage losses are due substantially to the mechanical energy consumed in the rotation of the rotor against the impedance of the environmental fluid or air. However, in many instances, for example, in the design of waterwheel generators, a rotor is structurally arranged to make beneficial use of surrounding air by directing the air across the machine's stator for cooling purposes. The windage losses of the cooling air passing through the stator are reduced somewhat by the application of fluid flow principles in the stator core structure. This is commonly accomplished by providing radial air passages through the stator core. In such radial cooling arrangements, the laminated core is subdivided into laminated units, between which vent plates having fingers defining radial air passages are provided. The cooling air generally flows between the rotor and the inner bore of the laminated stator core and escapes radially through the ventilation passages.

The finger members are generally riveted to the vent plates and are angularly displaced with respect to each other to define flow passages of variable cross-sectional area to achieve efficient flow of cooling air through the core. These fingers generally have rectangular tabs or rivets on various fixed spacings for engagement to corresponding rectangular slots in the vent plate.

In the construction of the prior art vent plates, the vent plate punchings are slotted with rectangular openings for receiving the finger rivets by using many different group slot dies. A different group die is required for each slot pattern which requires additional radius pieces, slot gauges, and many elaborate set-ups by an operator. The present prior art procedure is to use slot dies with two, three, or four slots and locate these slots manually by the use of radius pieces and pin gauges. It may be appreciated by those skilled in the art that this manual procedure is time consuming and susceptible to human error. For the foregoing reasons, it was deemed desirable to improve the design and characteristics of the vent plate so that it could be produced automatically by a machine.

SUMMARY OF THE INVENTION

In accordance with the present invention, a vent plate is provided having specially formed slots which may be located entirely by means of rectangular coordinates and thus can be punched with a two-axis punch press machine. The vent plate comprises generally a punching having a plurality of slot openings for receiving the rivet portions of the finger members which define the air flow passages through a core of a dynamoelectric machine. The slot openings are characterized generally by a bow-tie outline defined by intersecting planar and curved side surfaces. The intersecting side surface portions are symmetrically disposed about first and second lines of symmetry which are mutually perpendicular. The slot openings are elongated with respect to the first line of symmetry and the elongated side portions of the slot openings each comprise a pair of planar surfaces which intersect along the second line of symmetry. The slots also include first and second curved side portions which are disposed intermediate of the elongated intersecting side portions, with the curved side portions being concave with respect to the second line of symmetry. The length of the openings as measured through the point of intersection of the lines of symmetry from the first concave side surface to the second concave side surface is substantially equal to the length of the rivet portion of the finger member, and the width of the openings as measured along the second line of symmetry is substantially equal to the width of the rivet.

The finger rivets, when inserted in the openings, are rotatable through a predetermined angle which corresponds generally with the arc of the curved side surfaces of the opening to permit variable orientation of the rivets through a predetermined angular range. In a preferred embodiment of the invention, the curved side portions of the slot openings are an arc having an angular measure substantially equal to $\pi/N$ radians, N being a positive interger. In assembly, the rivet portions of the finger members are placed in engagement with the vent plate slot openings and are simply oriented within the limits allowed by the curved portion of the slots until the proper angular displacement and alignment of the finger members is achieved.

By this arrangement, the slots may be located on the face of the vent plate by means of a machine tool, including a control system for controlling the position of punch operations along respective X- and Y-axes of the machine tool, for example, by an automatic X-Y axis numerical control punch press. A method and apparatus for fabricating a vent plate of the type described above are also disclosed in the following description of the preferred embodiments.

BRIEF DESCRIPTION OF THE DRAWING

The invention will be more full understood from the following detailed description of the preferred embodiment taken in connection with the accompany drawing, in which.

DESCRIPTION OF THE PREFERRED EMBODIMENTS

Figure 1:
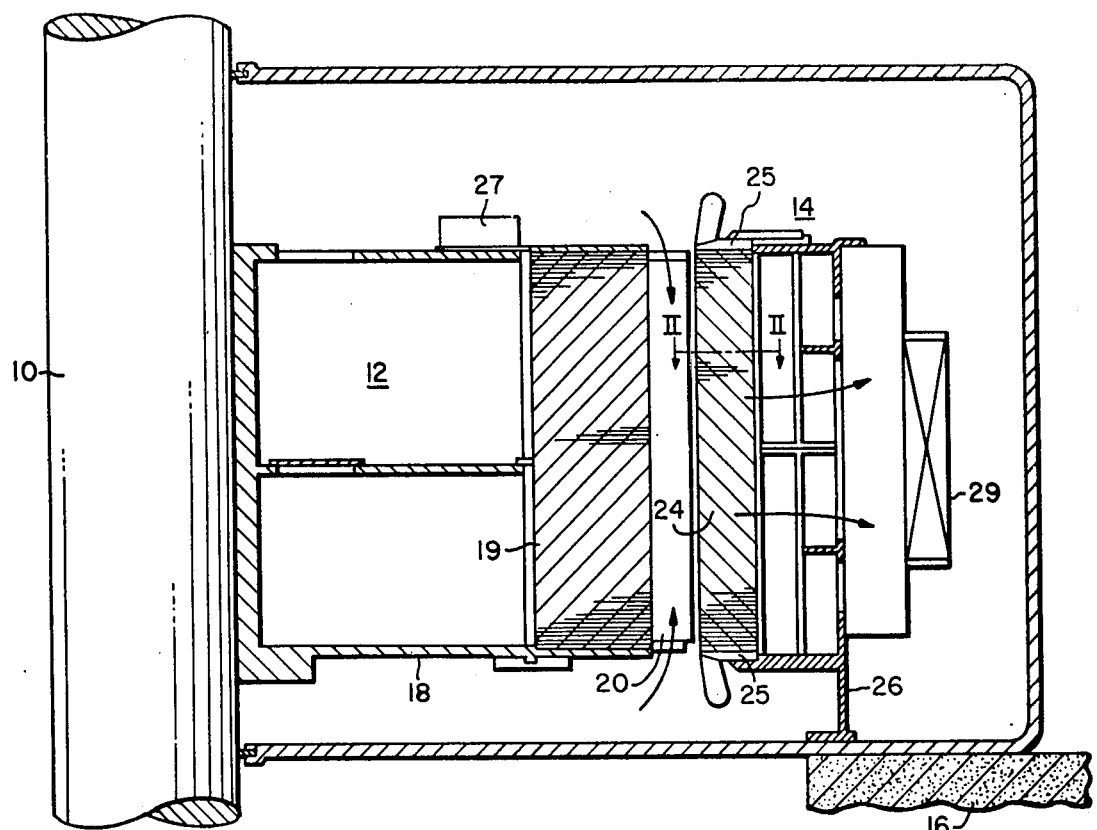
FIG. 1 is a vertical sectional view of a large dynamoelectric machine embodying the invention.

The invention is shown in the drawings embodied within the core of a large, vertical dynamoelectric machine suitable for use as a waterwheel driven generator or as a generator motor for pump storage power projects. The machine has a vertical shaft 10 carrying a rotor member 12 for cooperation with a stator 14 which is supported on a foundation 16 of any suitable type. The shaft 10 and rotor 12 are supported on a thrust bearing (not shown) of the usual type and the overall construction of the machine may be of any usual or desired type. The rotor 12 consists of a spider portion 18 mounted on the shaft 10 and which may be of any suitable or usual construction. A laminated rim 19 is carried on the spider portion 18 and salient poles 20 carrying field windings (not shown) are mounted in the usual manner on the rim 19. The rotor 12 may be of any suitable construction and may be cooled by its own ventilation system, either separately or in cooperation with that of the stator. The rotor is shown as being cooled by air flowing through the spider and flowing axially through the interpolar spaces as indicated by the arrows in FIG. 1.

The stator 14 comprises a laminated stator core 24 supported between end plates 25 in a frame 26 of any suitable construction supported on the foundation 16. The stator core 24 is of the usual laminated construction providing spaced radial vent ducts, as more fully described hereinafter, through which air may flow radially from the core.

Ventilating air may be circulated through the machine by any desired means which is shown as a centrifugal blower consisting of a plurality of blades 27 mounted on the rotor. Air flows from the blower in the path indicated by the arrows and through coolers 29, which may be of the usual type, any necessary number of coolers being provided about the circumference of the machine. The air flowing through the coolers is directed into suitable ducts for passage through the stator core 24 and, upon discharge from the stator core, is directed through the coolers 29. The air is preferably discharged for recirculation by the blower and by the rotor 12. It should be understood that for the purposes of the present invention any suitable type of blower may be used to cause the circulation of cooling air through the vent passages of the stator core.

Figure 2:
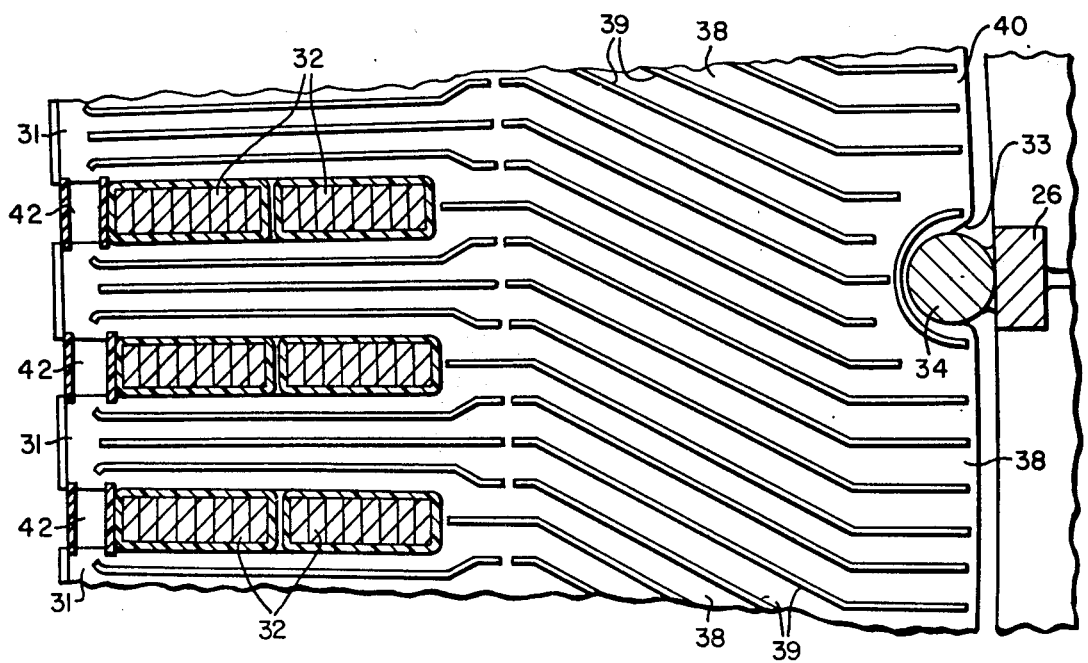
FIG. 2 is a fragmentary plan view of a portion of the stator core taken along the lines II—II.

As shown more particularly in FIG. 2 of the drawing, the stator core 24 is of laminated construction and is built up of the usual punchings to form a cylindrical core having a central bore therethrough with teeth 31 extending longitudinally of the bore to form slots between them for the reception of stator windings 32. The stator punchings may be of the usual type having recesses 33 at the outer periphery for reception of building bolts 34 on which the core is supported in the frame 26. If desired, openings may be provided in the punchings to form axial ducts through the core for passage of ventilating air in the usual manner. The stator core 24 is provided with a plurality of longitudinally spaced radial vent ducts 38 extending radially through the core from the central bore to the outer periphery. The vent ducts 38 are provided by attaching spacing fingers 39 to vent plates 40 located at the desired intervals between next adjacent laminations within the core to space the adjacent punchings apart and thus form the radial ducts 38. A plurality of the vent plates 40 are fitted end-to-end and arranged circumferentially around the core 24. In a typical construction, twenty-seven vent plate segments are so disposed.

A wedge 42, which may be of the usual type, is inserted in each slot engaging the winding to retain it in place. The preferred flow path of the air through the stator core is shown particularly by the arrows in FIG. 1, although it will be understood that other flow paths might be used.

Figure 3:
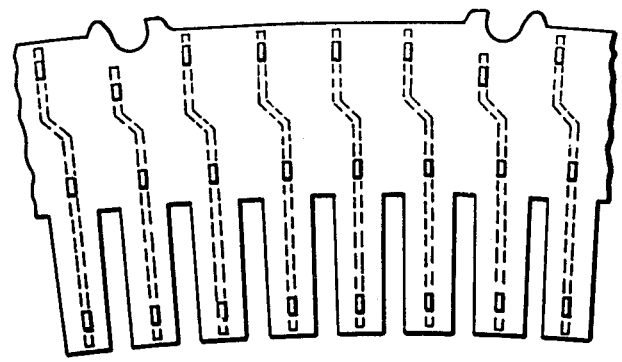
FIG. 3 is a plan view of a prior art vent plate.

Referring now to FIG. 3, a view of a prior art vent plate is shown in order to illustrate the difficulty in accurately locating and punching the rectangular slot openings by means of a two-axis controlled punch press. Because these slots are typically located on different angles with respect to a common reference point, multiple rectangular punch and die sets are required to provide the rectangular rivet slots. For each finger and ferrule configuration, a punch and die unique to that pattern is required. Prior to the present invention, the slot locations were located manually by the use of radius pieces and pin gauges.

Figure 4A:
FIG. 4A is a plan view of a typical vent finger which may be used with the present invention.
Figure 4B:
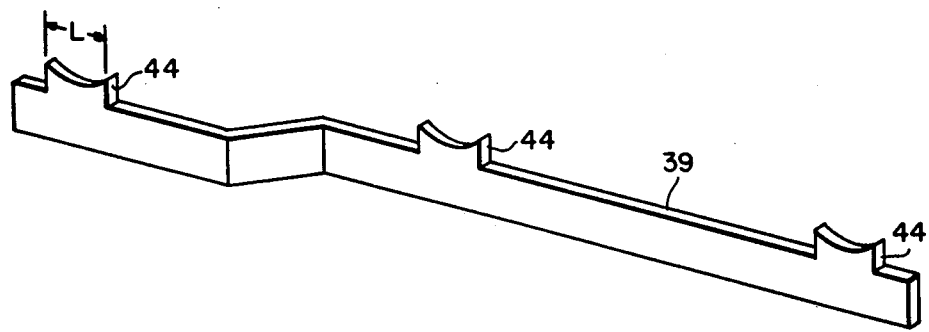
FIG. 4B is an isometric view of the vent finger of FIG. 4A.

FIGS. 4A and 4B illustrate typical finger members which may be utilized in combination with the present invention. The ventilating spaces 38 between the groups of laminations are formed by the ventilating fingers 39 which lie between the laminations and are secured at right angles to the vent plate 40 by the riveting of the rivet portions 44 to the underside of the vent plate.

Figure 6:
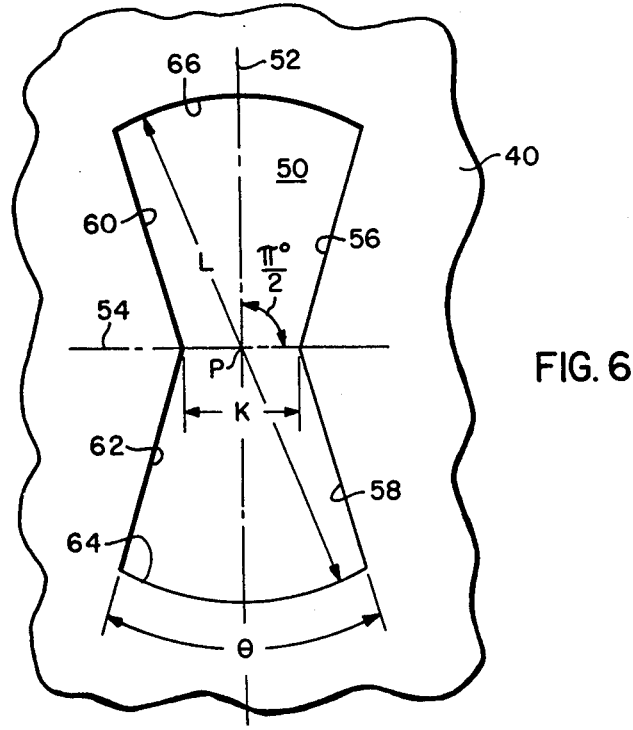
FIG. 6 is an enlarged view of a slot opening of the vent plate of FIG. 5.
Figure 5:
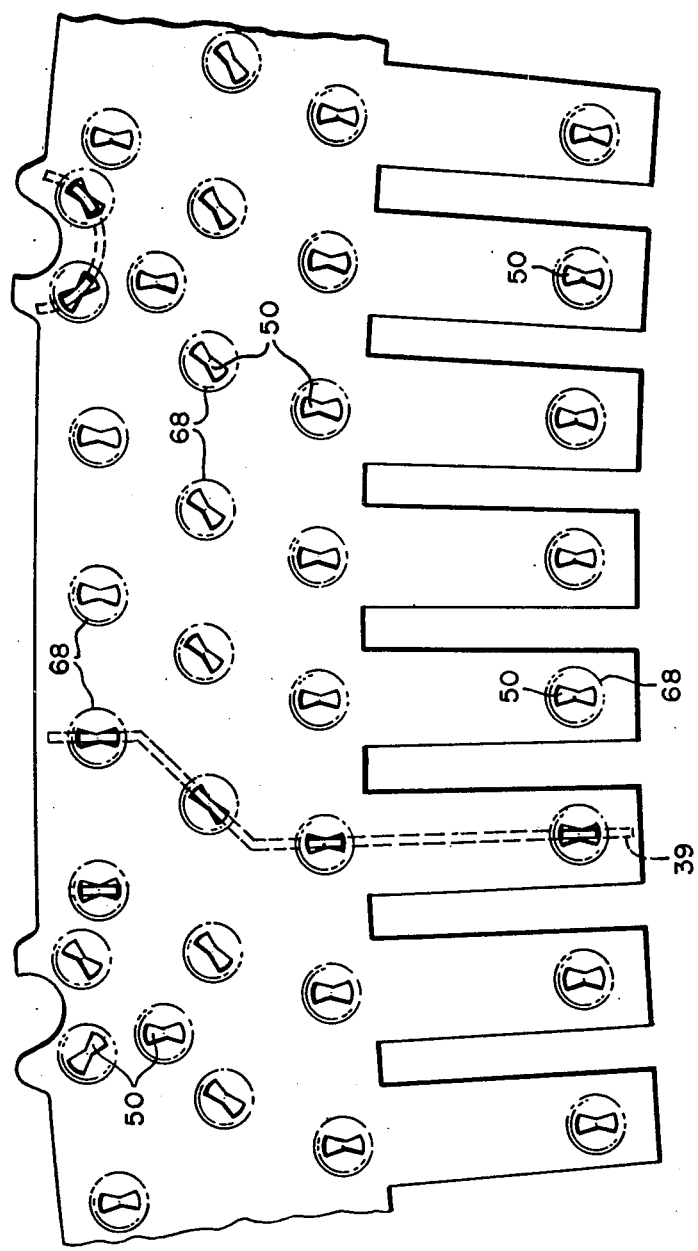
FIG. 5 is a simplified plan view of a vent plate having slot openings constructed according to the teachings of the present invention.

Turning now to FIG. 5, a view of a vent plate 40 furnished with slot openings 50 constructed according to the teachings of the present invention is shown. As shown in FIG. 6, each slot opening 50 is defined by a plurality of intersecting side portions which are symmetrically disposed about a first line of symmetry 52 and a second line of symmetry 54 which are mutually perpendicular with respect to each other. The slot opening 50 is preferably elongated along the first line of symmetry 52. A pair of planar surfaces 56 and 58 intersect along the second line 54 of symmetry on one side of the line 52 of symmetry. Intersecting planar surfaces 60 and 62 are similarly disposed on the other side of the center line of symmetry 52. Disposed intermediate of the elongated intersecting side portions 56, 62 are a pair of curved side portions 64, 66 which are concave with respect to the second line of symmetry 54. The length of the slot openings is indicated by the reference letter L and is measured through the point P of intersection of the center lines of symmetry 52 and 54 from the first concave side surface 64 to the second concave side surface 66. This dimension L is substantially equal to the length L of the rivet portion 44 of the finger member 39, as illustrated in FIGS. 4A and 4B. It may be expected, however, that the length of the rivet may be slightly less than the slot opening length in practice. The width of the slot opening 50 is indicated by the reference character K and is measured along the second line of symmetry 54 from the intersection points of the planar side surfaces 56, 58 and 60, 62. This dimension K is substantially equal to the width of the rivet portion as shown in FIG. 4A.

The openings 50 are generally characterized by a "bow-tie" outline, defined by the planar side surface portions 56, 58, 60, 62 and curved side surface portions 64, 66. The curved side surface portions are provided to permit variable orientation of the tab portions when they are inserted into the slot openings 50 in order to permit angular displacement of next adjacent finger members 39 with respect to each other across the surface of the vent plate 40. The tab portions 44 may be aligned through a predetermined angle $\theta$ which corresponds generally with the arc of the curved side surface portions 64 and 66. For reasons to be discussed hereinafter, the angle $\theta$ is preferably substantially equal to $\pi/N$ radians, where N is a positive integer.

Figure 7:
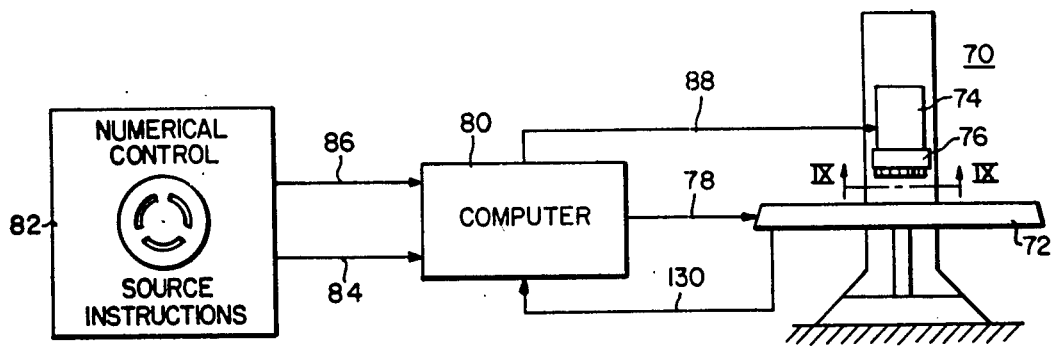
FIG. 7 is a block diagram of a numerically controlled punch press adapted to practice the method of the present invention.

A preferred arrangement of apparatus for fabricating the vent plate of the present invention is illustrated in FIG. 7 of the drawing. The apparatus includes a machine tool punch press 70 having a movable press table 72 for positioning a workpiece, a power head 74 for driving a machine tool punch, and a turret 76 carrying a plurality of machine punch tools. The machine tool 70 includes means for positioning the press table 72 along the respective X- and Y-axes of the machine tool in response to an appropriate command signal 78 from a computer 80. The computer 80 is responsive to a source 82 of numerical control positioning instructions for the table 72 and for the indexing and positioning of the appropriate punch tool of the turret 76. The computer 80 includes a computer memory and a computer output and is operably connected to receive machine tool positioning instruction signals 84 and 86 for controlling the operation of the computer and transmission of X and Y axis machine tool displacement command signal 78 and machine tool punch selection command signal 88 for control of the turret 76.

Figure 10:
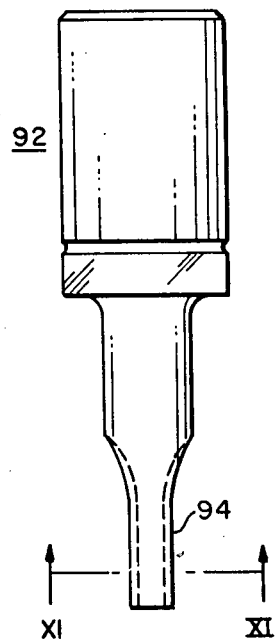
FIG. 10 is an elevation view of a punch tool constructed according to the teachings of the present invention.
Figure 9:
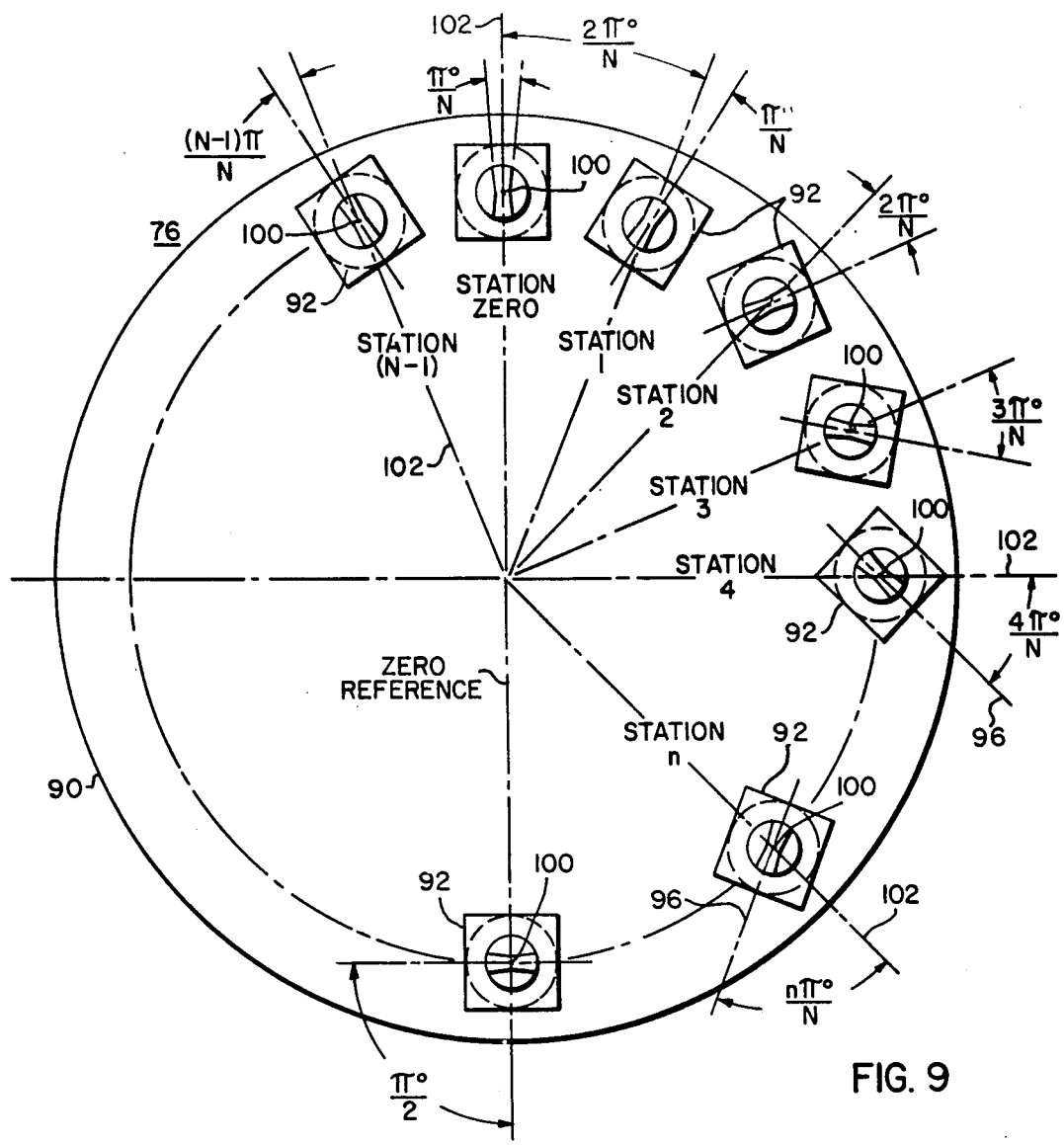
FIG. 9 is a section view of a turret constructed according to the present invention taken along line IX—IX of FIG. 7.

The turret 76 of the machine tool 70 is shown in greater detail in FIG. 9 of the drawing. The turret 76 includes a circular base member 90 on which a plurality N, N being a positive integer, of substantially identical punch tools 92 are disposed. Construction of the punch tools 92 is illustrated in greater detail in FIGS. 10 and 11 of the drawing. The punch tools 92 are disposed upon the base member 90 of the turret 76 at a plurality of stations 1-N. The center of each tool 92 is preferably disposed at substantially $2\pi/N$ radians with respect to the center of the tools located in next adjacent stations. This spacing is not critical, however, and any convenient angular spacing may be employed in the circular arrangement. Furthermore, the tools 92 may be disposed in a linear arrangement.

Figure 11:
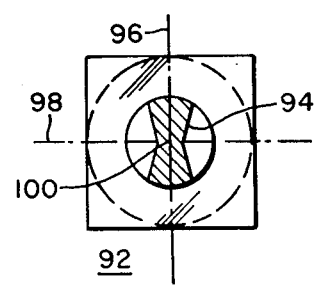
FIG. 11 is a section view of the punch tool of FIG. 10 taken along line XI—XI of FIG. 10.

The penetrating portion 94 of each tool 92 is characterized in cross section generally as having a bow-tie outline with first and second axes of symmetry, 96 and 98, respectively, which are mutually perpendicular (FIG. 11). The punch tools 92 are disposed upon the base member 90 with the points of intersection 100 of the first and second axes of symmetry 96 and 98 being arranged in a circular pattern, the points of intersection 100 at each station being angularly displaced with respect to the intersection points 100 of next adjacent stations by $2\pi/N$ radians. The first line of symmetry 96 of the punch tool 92 located at the nth station, n being a positive integer less than or equal to N, is angularly displaced by substantially $n\pi/N$ radians with respect to the radius line 102 which passes through the intersection point 100 of the first and second lines of symmetry 96 and 98. By this arrangement, the plurality N of punch tools 92 cover the entire range of 180 degrees in N discrete steps to accommodate the rivet portion 44 of the finger member 39 which typically is inclined obliquely with respect to the X-and Y-axes of the machine tool 70. Since the slots are symmetrical about mutually perpendicular axes, the effective coverage of this arrangement is 360 degrees.

Figure 8:
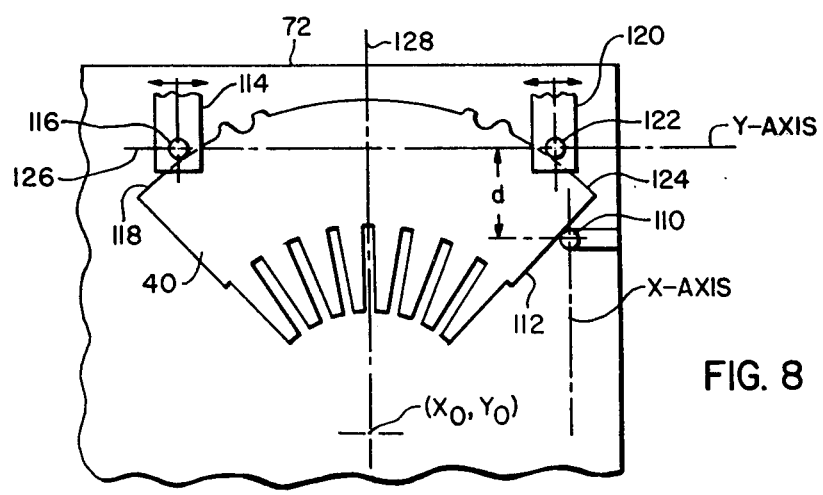
FIG. 8 is a plan view of the press table of FIG. 7 and clamping arrangement for fabrication of the vent plate of FIG. 5.

A clamping fixture suitable for securing the vent plate 40 to the press table 72 of the machine tool 70 is illustrated in FIG. 8 of the drawings. The clamping arrangement comprises generally the movable press table 72, upon which a pin 110 is rigidly secured at a fixed location with respect to the origin of the X-Y rectangular coordinate reference system of the machine tool 70. The pin 110 is suitably disposed upon the face of the press table 72 to engage a radial edge portion 112 of the vent plate 40. Also included is a first movable clamp 114 which has a projecting pin portion 116 for engaging a first curved edge portion 118 of the vent plate 40. Also included is a second movable clamp 120 which includes a projecting pin portion 122 for engaging a second curved edge portion 124 of the vent plate 40. The first and second movable clamps 114 and 120 are movable towards one another or apart from one another along a straight line 126, which is parallel to a selected one of the axes of the rectangular coordinate system, and in this example the line 126 is parallel to the Y-axis of the coordinate system. The line of travel 126 of the movable clamps 114 and 120 is displaced along the X axis by a preselected distance d from the fixed pin 110 to permit insertion of one corner of the vent plate 40 between the fixed pin 110 and the pin 122 of the movable clamp 120. After the vent plate 40 is arranged with its centerline of symmetry 128 aligned in parallel with the X-axis, the movable clamps 114 and 120 are tightened to hold the vent plate 40 securely against the press table 72 with the pins 110, 116 and 122 in engagement with the radial and curved edges, respectively, of the vent plate. The position of the movable pins 116 and 122 may be fed back electrically by a position indicating signal 130 to the computer which may be used to calculate the center of curvature $(X_O, Y_O)$ of the vent plate 40. Knowledge of the rectangular coordinates of the origin of curvature of the vent plate 40 is used by the computer 80 to provide exact positioning commands to the table 72 to position the vent plate properly for the punching operation.

In a typical punching operation in which a slot 50 is to be punched into the vent plate 40 to receive a rivet whose longitudinal axis is aligned along a line which is obliquely inclined with respect to the axes of the rectangular coordinate reference system of the machine tool 70, the vent plate 40 is first secured to the press table 72 in the manner described previously. The press table 72 is then moved according to the instructions 84 from the numerical control source 82 and in accordance with the command signal 78 from the computer 80 to position the vent plate to receive a punch 92 at a predetermined punch location. The computer 80 utilizes the position feedback signal 130 from the table to determine the angle of inclination of a radial line drawn from the origin of curvature $(X_O, Y_O)$ through the predetermined punch location. The computer then issues an indexing command signal 88 which causes the turret 76 to rotate to position the nth punch tool whose slot orientation range of $n\pi/N \pm \pi/2N$ degrees includes the angle of inclination of the radial line. An additional command signal 88 is then directed to the head 74 of the machine tool 70 to punch the vent plate at the predetermined punch location with the punch tool disposed at the selected nth station.

The vent plate surface area surrounding each of the openings 50 is preferably embossed as indicated by the markings 68. The embossed regions 68 serve to slightly elevate the finger members 39 and also provide a recess for receiving the tab portions 44 as they are riveted to the underside of the vent plate 40.

It will now be apparent that an improved vent plate has been provided for use in a laminated core of a dynamoelectric machine. The new vent plate slot opening disclosed herein makes possible a very marked improvement in the fabrication procedures for the vent plate which reduces the set-up complexity and running time plate. Because of the unique geometry of the vent plate slot opening, a vent plate member using these openings can be manufactured automatically by means of a two-axis rectangular coordinate tape controlled punch press, as opposed to the conventional manual method of using radius pieces and pin gauges, with a substantial improvement in efficiency.

We claim:

1. In a machine tool of the type having a table for supporting a workpiece, a head operable to drive a punch tool, means for positioning parts of said machine tool along respective X- and Y-axes of the machine tool, the combination with said head of an improved turret, said turret comprising:
   a circular base member;
   a plurality N of substantially identical punch tools secured to said base member, N being a positive integer, each of said punch tools having first and second axes of symmetry which are mutually perpendicular, said punch tools being disposed upon the face of said base member at N stations, with the points of intersection of said first and second axes of symmetry being arranged in a circular pattern, said points of intersection at each station being angularly displaced with respect to the intersection points of next adjacent stations, the first line of symmetry of the nth station, n being a positive interger less than or equal to N, being angularly displaced by $n\pi/N$ radian with respect to the radius line of said circular base member which passes through the point of intersection of said first and second lines of symmetry of said nth punch tool.

2. The machine tool as defined by claim 1, wherein the penetrating portion of each punch tool is characterized by a bow-tie outline in cross-section and is defined by intersecting planar and curved side surfaces, said curved side surfaces being an arc measuring substantially $\pi/N$ radian.

3. The machine tool as defined by claim 1, wherein said means for controlling the positioning operations of parts of said machine tool along respective X- and Y-axes of said machine tool comprises:
   source means for supplying machine tool positioning instructions;
   a computer having as part thereof a computer memory and a computer output, said computer being operably connected to said source means to receive said machine tool positioning instructions therefrom, said computer memory having stored therein a machine tool control program for controlling the operation of the computer output and transmission of X- and Y-axis machine tool displacement commands in accordance with the machine tool positioning instructions supplied to said computer by said source means; and,
   a machine tool positioning control system having an input connected to receive positioning commands from said computer and having an output operably connected with the X- and Y-axis drive portions of said machine tool for controlling the positioning movement of the respective parts of the machine tool along the respective X- and Y-axes of the machine tool.

4. The machine tool as defined by claim 3, said source means including index positioning instructions for said turret, and including means operably connected to said turret to position the punch tool located at the nth station in operating position in accordance with index positioning commands from said computer.

5. A method of forming a slot in a vent plate by means of a machine tool having a press table for holding said vent plate, means for controlling the position of said press table along respective X and Y axes of said machine tool, and having a plurality N, N being a positive integer, of substantially identical punch tools disposed in an ordered array of N stations, the penetrating portion of each said punch tool being characterized by a bow-tie outline, in cross-section, and being defined by intersecting planar and curved side surfaces, said curved side surfaces being an arc measuring substantially $\pi/N$ radians, the penetrating portion having a principal axis of symmetry, the axis of symmetry of the punch tool of the nth station, n being a positive integer less than or equal to N, being angularly displaced by $n\pi/N$ radians with respect to a selected one of the axes of said rectangular coordinate reference system as measured when said nth punch tool is placed in punching position, said slot being adapted to receive a rivet having a rectangular cross-section, the longitudinal axis of said rivet, when inserted in said slot, being aligned along a line which is obliquely inclined with respect to the axes of a selected rectangular coordinate reference system, comprising:
   securing the vent plate to the press table;
   moving said press table to position said vent plate to receive a punch at a predetermined punch location;
   measuring the angle of inclination of the radial line drawn from the origin of curvature of said vent plate through said predetermined punch location;
   selecting and placing in operating position the nth punch tool having the slot orientation range of $(n\pi/N \pm \pi/2N)$ radians which includes said angle of inclination of said radial line; and,
   punching said vent plate at said predetermined punch location with said selected punch tool.

6. The method of claim 5 wherein the movement of said press table and the selection of said nth punch tool is controlled by source means for supplying the machine tool positioning instructions, the instructions being coordinated by a computer having as part thereof a computer memory and a computer output, said computer memory having stored therein a machine tool control program for controlling said computer output of X- and Y-axis machine tool displacement commands and punch tool indexing commands in accordance with the machine tool positioning instructions supplied to said computer by said source means.

* * * * *